US006165117A

United States Patent [19]
Adami

[11] Patent Number: 6,165,117
[45] **Date of Patent: *Dec. 26, 2000**

[54] DEVICE AND METHOD FOR THE SLITTING OF A WEB AND SLITTER/SCORER MACHINE INCORPORATING SAID DEVICE

[75] Inventor: Mauro Adami, Viareggio/Lucca, Italy

[73] Assignee: Fosber, S.p.A., Lucca, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 09/098,345

[22] Filed: Jun. 17, 1998

[30] Foreign Application Priority Data

Jun. 18, 1997 [IT] Italy .................................. FI97A0143

[51] Int. Cl.[7] ............................ B31B 49/00; B62D 7/08; B62D 7/06; B62D 1/14

[52] U.S. Cl. .......................... 493/365; 493/367; 493/369; 83/169; 83/407; 83/425.4; 83/477.1; 83/508.3

[58] Field of Search .................................... 493/364, 365, 493/366, 367, 370, 64, 60, 369; 83/349, 169, 508, 508.1, 508.2, 508.3, 477.1, 425.2, 425.3, 425.4, 407, 408, 425

[56] References Cited

U.S. PATENT DOCUMENTS

| | | | |
|---|---|---|---|
| Re. 35,345 | 10/1996 | Adami . | |
| 2,003,404 | 6/1935 | Valentine . | |
| 2,396,315 | 3/1946 | Bruker | 493/370 |
| 3,332,326 | 7/1967 | Haas . | |
| 3,646,418 | 2/1972 | Sterns et al. . | |
| 3,763,748 | 10/1973 | Gallagher, Jr. | 83/508 |
| 4,519,285 | 5/1985 | Dontscheff | 83/508 |
| 4,561,335 | 12/1985 | Wingen | 83/508.1 |
| 4,976,676 | 12/1990 | Mensing et al. | 493/365 |
| 5,090,281 | 2/1992 | Paulson et al. . | |
| 5,393,294 | 2/1995 | Jobst . | |
| 5,406,869 | 4/1995 | Prochnow et al. . | |

FOREIGN PATENT DOCUMENTS

| | | |
|---|---|---|
| 0 582 074 A1 | 2/1994 | European Pat. Off. . |
| 0 585 927 A2 | 3/1994 | European Pat. Off. . |
| 0 607 084 A1 | 7/1994 | European Pat. Off. . |
| 0 541 953 B1 | 3/1995 | European Pat. Off. . |
| 0 692 369 A1 | 1/1996 | European Pat. Off. . |
| 0 737 553 A1 | 10/1996 | European Pat. Off. . |
| 91 13562 | 1/1992 | Germany . |
| 42 28 686 A1 | 3/1994 | Germany . |
| 44 46 766 A1 | 6/1996 | Germany . |
| 8-164572 | 6/1996 | Japan . |
| 1 399 628 | 7/1975 | United Kingdom . |
| 2 124 533 | 2/1984 | United Kingdom . |

*Primary Examiner*—Brian L. Johnson
*Assistant Examiner*—Matthew Luby
*Attorney, Agent, or Firm*—Breiner & Breiner

[57] ABSTRACT

The device comprises at least one circular slitting tool (25; 25B) with an axis of rotation located on one side of the path of the web, which works in conjunction with an edge (68; 68B) that supports the web (N) and that is situated on the opposite side of said path (P) from the tool axis and essentially perpendicular to the direction of forward travel (F) of the web and over which said web (N) travels during its advance.

25 Claims, 5 Drawing Sheets

DEVICE AND METHOD FOR THE SLITTING OF A WEB AND SLITTER/SCORER MACHINE INCORPORATING SAID DEVICE

TECHNICAL FIELD

This invention relates to a device for the slitting of a continuous web, such as for example, and in particular, a web of corrugated board.

This invention also relates to a method for the slitting of a web of the abovementioned type, and to a so-called slitter/scorer machine for processing corrugated board or similar web material, that incorporates said device.

BACKGROUND ART

The industry of the manufacture and conversion of corrugated board employs machines known as slitter/scorers that slit a web of continuous material into a plurality of strips of smaller width than the width of the web, and that also produce score lines on said strips, that is to say lines preparatory to the subsequent folding of the material.

U.S. Pat. No. Re. 35,345 discloses a slitter/scorer machine in which each slit line is produced by two disk blades pressed against each other. In U.S. Pat. No. 5,090,281 each slit line is produced by a blade rotating at high speed and working in conjunction with an opposing roller with an annular channel into which the blade enters. The opposing roller provides support for the web during slitting. U.S. Pat. No. 5,406,869 discloses a system in which the web is supported by a flat surface over which the web travels. The flat surface contains a longitudinal groove into which the blade passes and a series of holes through which air is blown to create a cushion of air on which the web is supported.

In JP-A 8-164572, besides the solutions described above, an account is also given of a machine in which the slitter blades work in conjunction with brushes situated underneath, and the board passes between the blade and the brushes. This method has the disadvantage that the blades damage the brushes, making it necessary to replace the brushes at frequent intervals.

In the manufacture of sheets of board slit and scored from continuous webs, the format and therefore the position of the slit lines and score lines has to be changed frequently, since the machinery does different jobs requiring different sheets in rapid succession. It is for this reason that slitter/scorer machines with two in-line series of scoring tools and two in-line series of slitting tools are used. This makes it possible to process one sheet job on one series of scoring tools and slitting tools, while the other series of scoring and slitting tools is positioned by robots for the processing of the next job. Since the slitting tools usually include, for each slitting line, one blade and one counterblade, it is necessary to employ two positioning robots, one for the blades and one for the counterblades.

This makes the machine complicated and expensive.

Other examples of machines for slitting and scoring webs of corrugated board or similar materials are disclosed in EP-A-0 541 953, EP-A-0 607 084, EP-A-0 692 369 and EP-A-0 737 553. All these machines provide a counterblade for each slitting blade.

In all the slitting devices in which the slitting tool operates in conjunction with an opposing channel, formed in rotating counterblade or in a surface or in the form of supporting brushes or fingers, there is the additional disadvantage that the web undergoes deformation along the line of penetration and exit of the slitting tool from the underside of the web: what happens is that at the point at which the slitting tool emerges from the underside of the web, the web tends to be pulled down by the sides of the slitting tool into the channel below. This produces an irregularity in the edge of the line where the web has been slit, especially where the web is corrugated board.

OBJECTS OF THE INVENTION

One object of this invention is to provide a slitting device that is particularly suitable for slitting corrugated board and similar materials and that is capable of producing, simply and economically, a more uniform slit in the material without deforming the edge along which the slit is produced.

A further object of this invention is to provide a slitting device for webs such as webs of corrugated board and the like, that will be particularly suitable for use as a slitting tool in, for example, a slitter/scorer machine and that will be very simple, inexpensive and reliable.

Another object of a particularly advantageous embodiment of this invention is to provide a slitting device that will simplify the operations of positioning the slitting tools and reduce the cost of the tool positioning systems.

Yet another object of the present invention is to provide a slitter/scorer machine that is economical and reliable and very simple as regards the positioning of the slitting tools.

It is also an object of the present invention to provide a slitting method that is particularly suitable for slitter/scorer machines and enables the positioning of the tools to be simplified and hence the costs of the machinery to be reduced.

SUMMARY OF THE INVENTION

These and other objects and advantages, which will be clear to those skilled in the art from reading the text that follows, are achieved with a slitting device comprising at least one rotating circular slitting tool, characterized in that the slitting tool works in conjunction with an edge that supports the web and that is situated on the opposite side from the axis of rotation of the slitting tool with respect to the web and essentially perpendicular to the direction of forward travel of the web and over which the web travels during its advance, the slitting tool projecting beneath the web into a space downstream of said edge with respect to the direction of forward travel of the web. Thus, in the slitting position, downstream of the point where the slitting tool projects beneath the web in the course of slitting, no supporting surface is provided, but only an empty space.

In essence, the invention is based on the recognition of the fact that for the purposes of slitting a web there is no need for the web to rest on an opposing surface underneath the slitting tool. Instead the only support required is that of a transverse edge immediately upstream of or level with the point of penetration of the slitting tool into the web. This means that in the first place it is possible to produce a more precise slit without web deformation. This is because there is no longitudinal slot or channel for the slitting tool to enter and into which the tool can force the web during the slitting action, which would cause it to deform. The risk is also avoided of an accumulation of scrap from the web in the slot which is usually present underneath the slitting tool and which the tool enters as it emerges from the web.

In general terms it is possible to provide many different short supporting edges underneath the path of the web and extending perpendicularly to the direction of forward travel of the web. Where this approach is adopted, each supporting edge will be positioned in each case where required for the corresponding slitting tool.

However, in a preferred embodiment, the supporting edge can be made as a fixed item whose length is approximately equal to the maximum width of the web to be slit, or more generally such as to be substantially continuous in those areas where the slitting tools can operate. This offers a valuable additional advantage, namely that by this means it is no longer necessary to employ moveable parts under the path of forward travel of the web, having to be positioned each time there is a change of job. Instead, the supporting edge, which is of convenient length running across the direction in which the web is fed, will always provide at every point a sufficient opposing support for the slit to be effected. When a change of job occurs, therefore, only the slitting tools located above the path of forward travel of the web require positioning.

The result is to greatly simplify the machine, since the positioning of the slitting tools no longer requires the simultaneous positioning of the supporting surfaces or counterblades usually placed underneath the web.

This is of particular advantage in the case of slitter machines or slitter and scorer machines having a single series of slitting tools that are positioned very rapidly between the end of one job and the beginning of the next. By eliminating the counterblades and any supporting surface underneath the slitting tools, which have to be positioned, the amount of mass that has to be moved in order to position the tools is greatly reduced. This makes for a much faster and more reliable machine.

Downstream of the supporting edge there is preferably a channel or opening in the surface over which the web travels, perpendicular to the direction of forward travel of the web, which said tool enters, while the web travels over said channel or opening. Downstream of the channel or opening, the web, now slit into strips, finds a new supporting surface. The opening may preferably be open at the bottom to allow removal of the dust generated during slitting. Suction means may alternatively be provided in a channel below the slitting zone.

The invention can in principle also be applied to machines and devices with a single slitting tool. However, the advantages of the invention will be realized more especially in devices using a plurality of slitting tools capable of being positioned wherever needed. In particular, the invention is particularly advantageous if used in devices for slitting and/or slitting and scoring corrugated board or other web, with at least one series of tools or two or more series of tools designed to operate one at a time, while the nonworking series is being positioned ready to process the next order. In this form the arrangement according to the invention halves the size and cost of the positioning means. Furthermore the reduction in moving parts and positioning robots enhances the reliability of the device.

In one possible embodiment, each slitting tool is supported by an arm pivoting about an axis parallel to the supporting edge and working in conjunction with an adjustable stop. The position of the tool with respect to the position of the web supporting edge can thus be adjusted simply and reliably. In order to obtain a high-quality slit it is advantageous for the distance between the cutting edge of the tool and the supporting edge to be reduced to the minimum necessary to avoid wear of the cutting edge. However, the supporting edge may be designed to be easily replaceable. Furthermore, the adjustability of the stop may enable the wear of the slitting tool, which takes place in any case because of the periodic sharpening, to be compensated for.

Other advantageous features of the device according to the invention are indicated in the appended claims.

The method according to the invention comprises the following stages:

- arranging a rotating tool with its axis of rotation on one side of the path of the web;
- arranging, on the opposite side of the path of the web, a supporting edge perpendicular to the direction of forward travel of the web;
- bringing the slitting tool close to said edge;
- feeding said web along said path so that it is supported by and travels over said supporting edge;
- and causing said slitting tool to project from the web downstream of the supporting edge with respect to the direction of forward travel (F) of the web.

BRIEF DESCRIPTION OF THE DRAWINGS

A clearer understanding of the invention will be gained from the description and accompanying drawing, which latter shows a practical nonrestrictive embodiment of the invention. In the drawing.

DETAILED DESCRIPTION OF THE PREFERRED EMBODIMENT OF THE INVENTION

Figure 1:
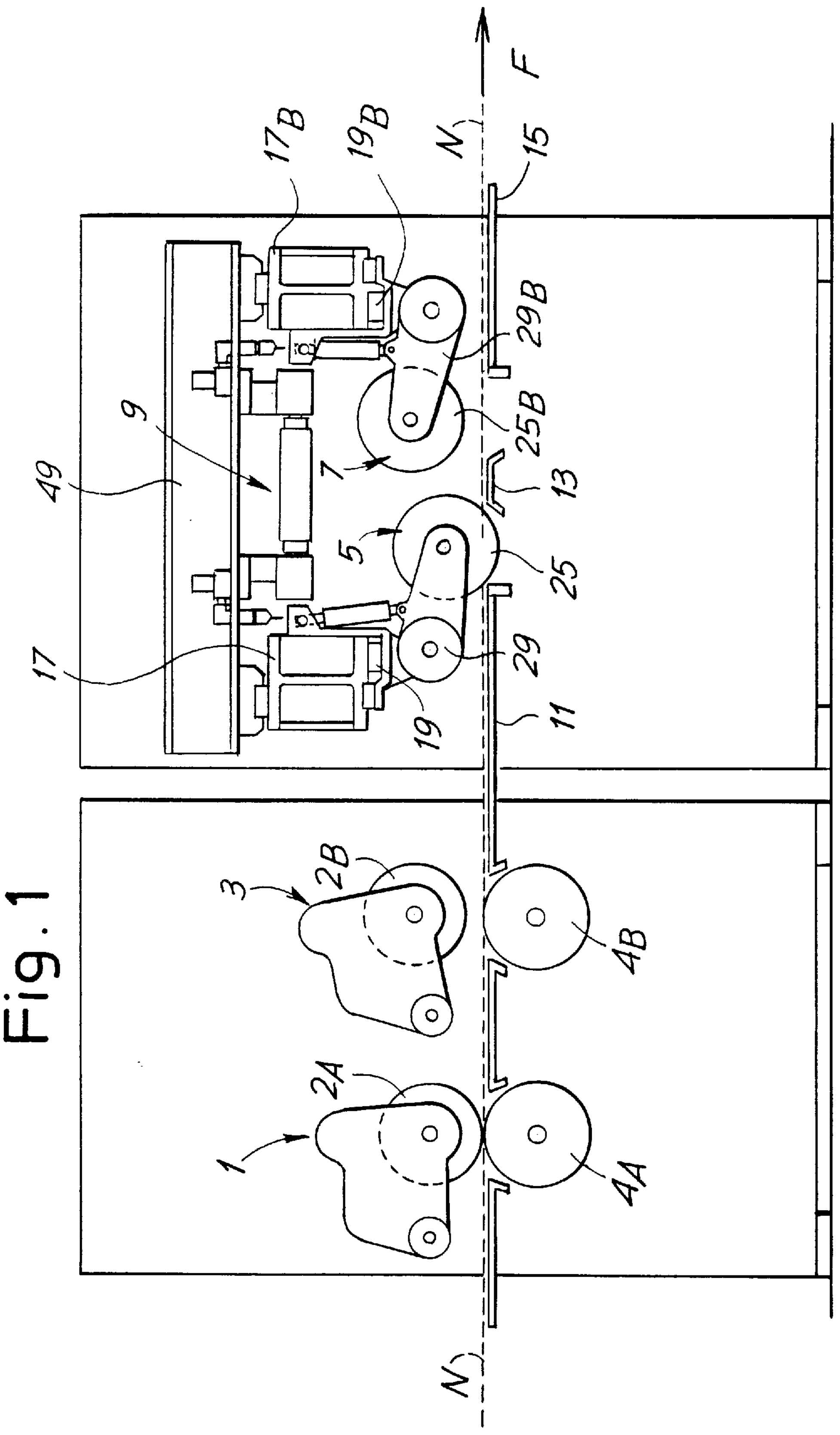
FIG. 1 shows a schematic side view of a slitter/scorer machine incorporating a slitting device according to the invention.

Shown generically in FIG. 1 is the structure of a machine for slitting and scoring a web N coming from, say, a corrugated board production line. The machine comprises a first scoring station 1, a second scoring station 3, a first slitting station 5 and a second slitting station 7. The four stations may be arranged in a variety of different ways and in the example illustrated the two scoring stations are located upstream of the slitting station, but this is not obligatory. Arrangements in which the scoring and slitting stations are arranged alternately are also possible.

Although this is the most usual configuration, slitter/scorer machines in which the scoring station and/or slitting station comprise only a single series of tools also exist. In such cases, during the change between jobs the tools are moved rapidly during the interval of time necessary to switch from one job to the next and there is never any series of tools on standby. The invention will be described below with reference to a complex machine with two series of tools working alternately, but it should be understood that the invention also can be applied to slitter/scorer machines and/or to slitting sections or slitting machines with only one series of tools.

In the position shown in FIG. 1, the scoring tools of station 1, denoted 2A, 4A are active, while those of station 3, denoted 2B, 4B, are disengaged from the web N and can be positioned by a positioning robot (not shown). The slitting tools of station 7 are inactive and can be positioned by the positioning robot, general reference 9, while those of station 5 are active.

The two slitting stations 5 and 7 are essentially symmetrical and their component parts are therefore basically the same, so that the following description will describe station 5 in detail. Identical or corresponding parts also found in station 7 are denoted by the same reference numerals followed by the letter "B".

Reference P denotes the path of the web N, which runs on sliding surfaces 11, 13, 15 as it passes through the slitting stations 5, 7.

Figure 2:
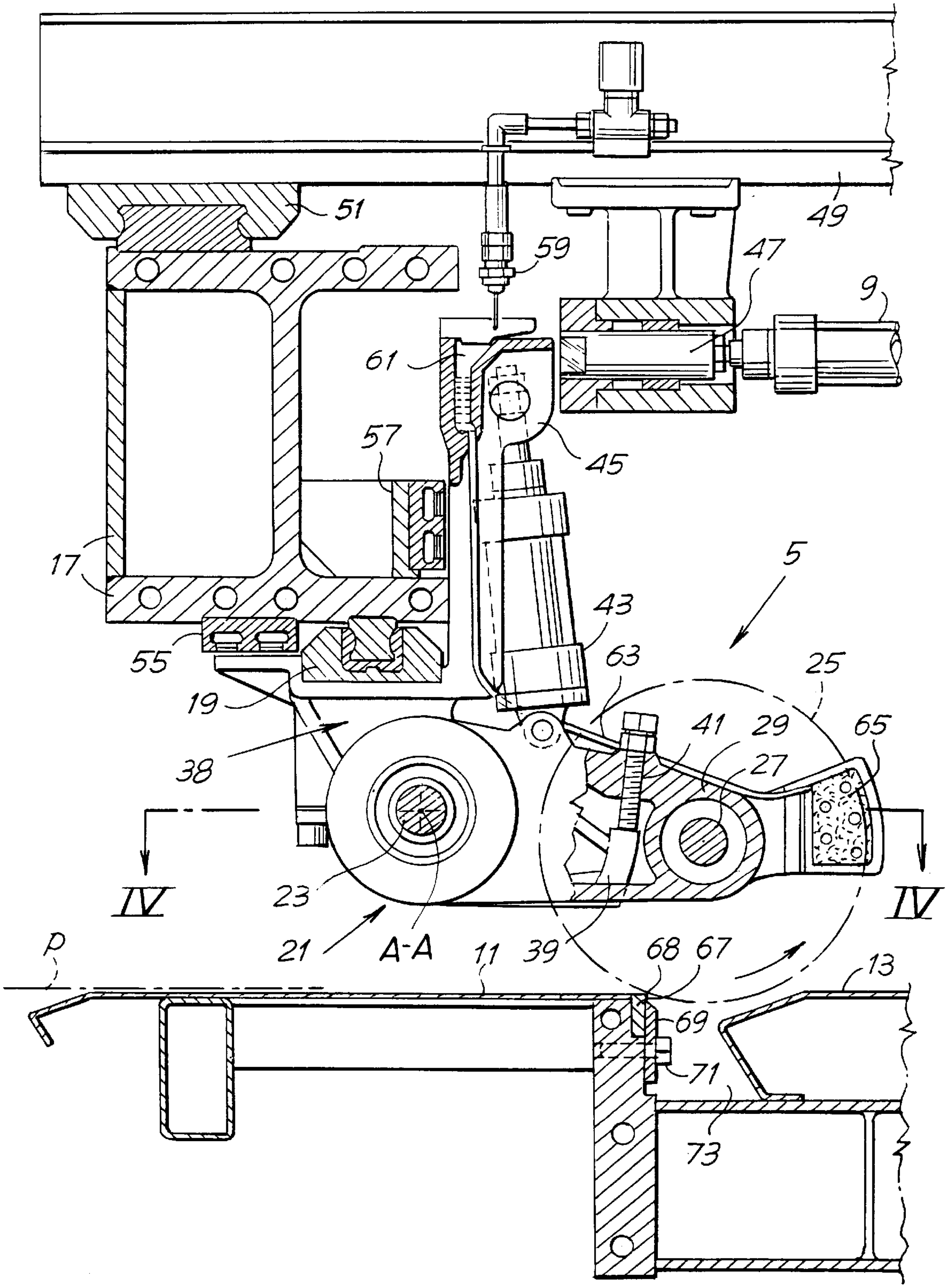
FIG. 2 shows an enlarged side view of one of the slitting stations, with the tools active.

Slitting station 5 comprises a crossbeam 17, attached to the underside of which is a track 19 running transversely to the direction F of forward travel of the web. A plurality of slitting units 21, one of which is visible in FIG. 2 in longitudinal section on a vertical plane and in FIG. 4 in a section on IV—IV, travels along the track 19. Passing through the various slitting units 21 is a driving shaft 23 providing power to the various slitting tools of the slitting units 21. Each slitting tool, demarked 25, is keyed to a spindle 27 supported at the end of an arm 29 that pivots about the axis A—A of the driving shaft 23. The tool turns anticlockwise, in the example, and has a peripheral speed of typically 3–4 times the forward travel speed of the web.

The spindle 27 takes its power from an intermediate transmission comprising a belt 31 running around a first pulley 33 torsionally connected to the driving shaft 23, but able to move axially along it, and a second pulley 35 keyed to the spindle 27.

Figure 4:
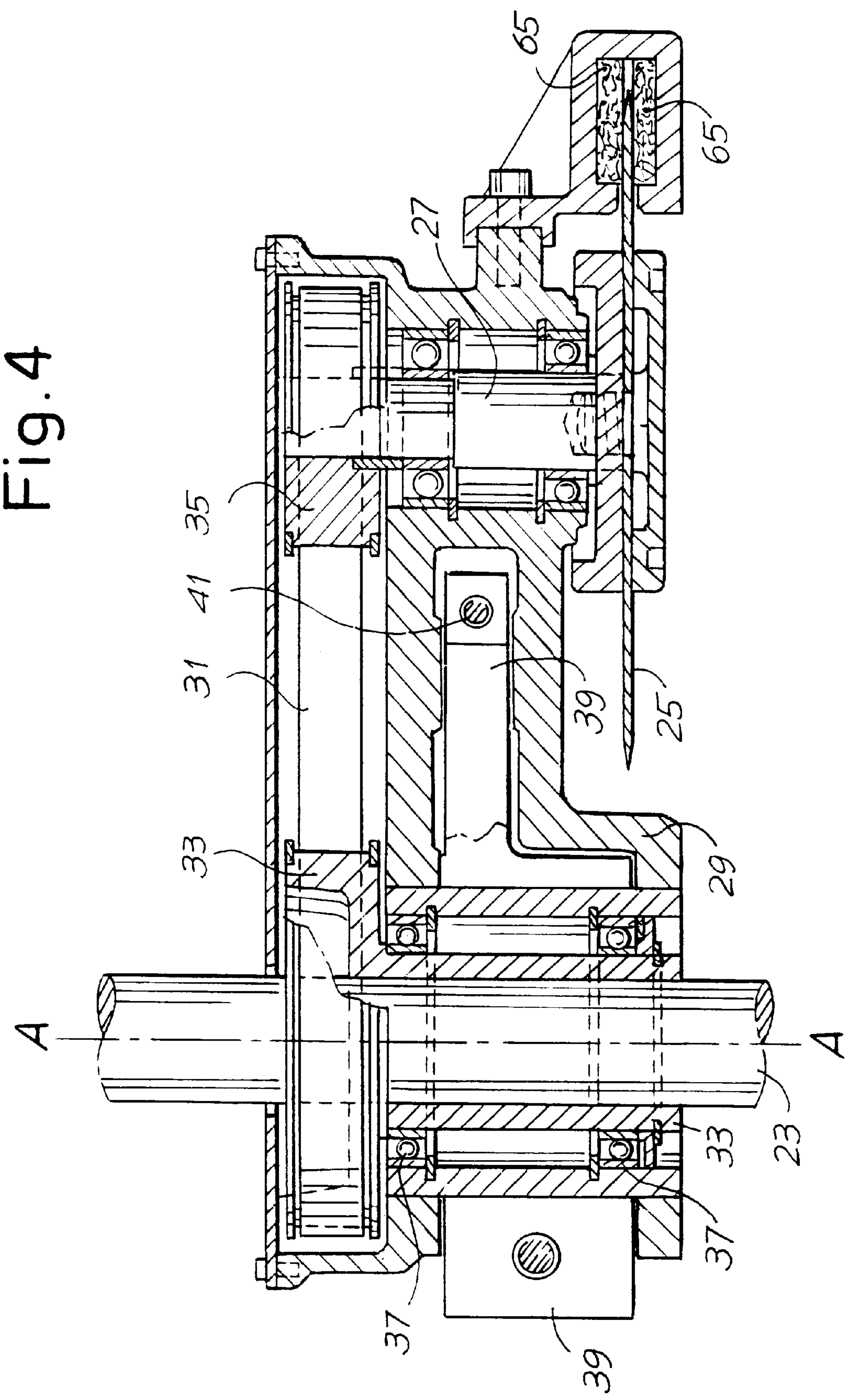
FIG. 4 shows a section on IV—IV as marked in FIG. 2.

The pivoting arm 29 (cp. FIG. 4) is mounted on a sleeve 30 allowing it to pivot about the axis A—A relative to a block 38 that can travel along the track 19. The block 38 is clamped to the sleeve 30, so as not to pivot with it, and has an extension 39 extending inside the pivoting arm 29 (cp. FIG. 4) that forms a bearing surface for an adjustable stop 41 fixed to the pivoting arm 29. In the example illustrated the stop 41 is a threaded pin for adjusting the position adopted by the pivoting arm 29 when the stop 41 bears against the extension 39. The sleeve 30 contains bearings 37 for supporting the pulley 33, which in turn supports the driving shaft 23.

Figure 3:
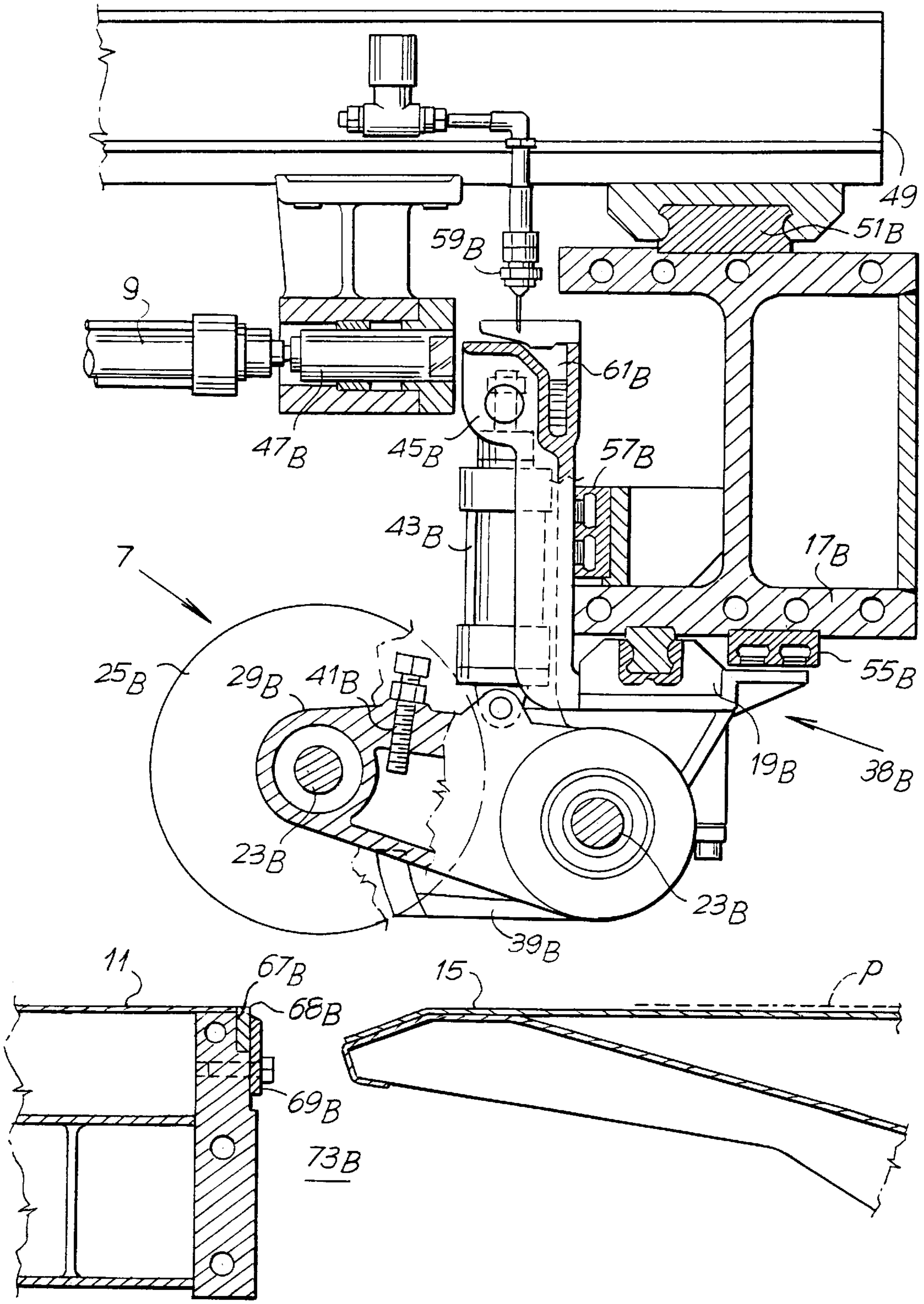
FIG. 3 shows an enlarged side view of the other slitting station, with the tools inactive.

The pivoting of the arm 29 is controlled by a piston/cylinder actuator 43 in which the cylinder is hinged to the pivoting arm 29, while the end of the piston rod is hinged to an upright 45 belonging to the block 38. The piston/cylinder actuator 43 moves its pivoting arm 29 back and forth between a working position, shown in FIG. 2, in which the stop 41 is in contact with the bearing surface of the extension 39, and a nonworking position shown in FIG. 3 in respect of the arm 29B of the second slitting station 7.

Each slitting unit 21 is positioned along the track 19 by means of a manipulator 47 carried by a carriage 49 travelling along rails 51, 51 B on the crossbeams 17 and 17B of the two slitting stations 5 and 7. Once in the working position, the unit 21 is immobilized by pneumatic immobilizing systems 55, 57 or the like.

The carriage 49 carries, in addition to the manipulator 47, a dispenser 59 of a lubricating substance which is dispensed into a funnel-shaped reservoir 61. Said reservoir 61 is connected by a hose 63 leading to a pair of lubricating felts 65 defining a gap between themselves in which the slitting tool 25 runs. The lubricating substance in the reservoir 61 can be topped up, e.g. every time the slitting unit 21 is positioned, or more frequently, e.g. in proportion to how much web has been slit.

The carriage 49 also carries a manipulator 47B for positioning the slitting units 21B of the second station 7, as well as a dispenser 59B supplying the lubricating substance to the pairs of lubricating felts of the slitting tools 25B of the various slitting units 21B.

Below the slitting tools 25 of the slitting station 5, underneath the path P of the web N is a rectangular-sectioned bar 67 arranged such that one of its edges 68 lies in the plane of travel defined by the surface 11. The bar 67 is locked in a seat by a clamping batten 69 and screw means 71 for easy replacement of the bar, or for modifying its position in such a way that the four edges of the bar are positioned along the travel surface 11 in succession.

The transverse edge 68 defines a supporting edge for the web during slitting.

It is possible to provide a single bar 67 extending across the full width of the travel surface 11, or at least across the full width usable by the slitting tools 25. Alternatively, several bars of shorter length may be arranged side by side to define an essentially continuous transverse supporting edge across the entire width of the machine or across the entire zone of positioning of the slitting tools 25. As will become clear later, the continuity of the transverse supporting edge 68 must be such that the tools 25 can be positioned in any of the possible transverse positions in which a longitudinal slit line may be required in the web N. If therefore the possibility of slit lines in certain parts of the transverse width of the machine or of the path of the web N is ruled out, in such parts the edge 68 defined by the bar or bars 67 may be interrupted.

Downstream of the bar 67, between it and the surface 13, is a transverse channel or opening 73.

A similar arrangement is used for the slitting station 7, the only difference being that the channel or opening 73B is open at the bottom.

Figure 5:
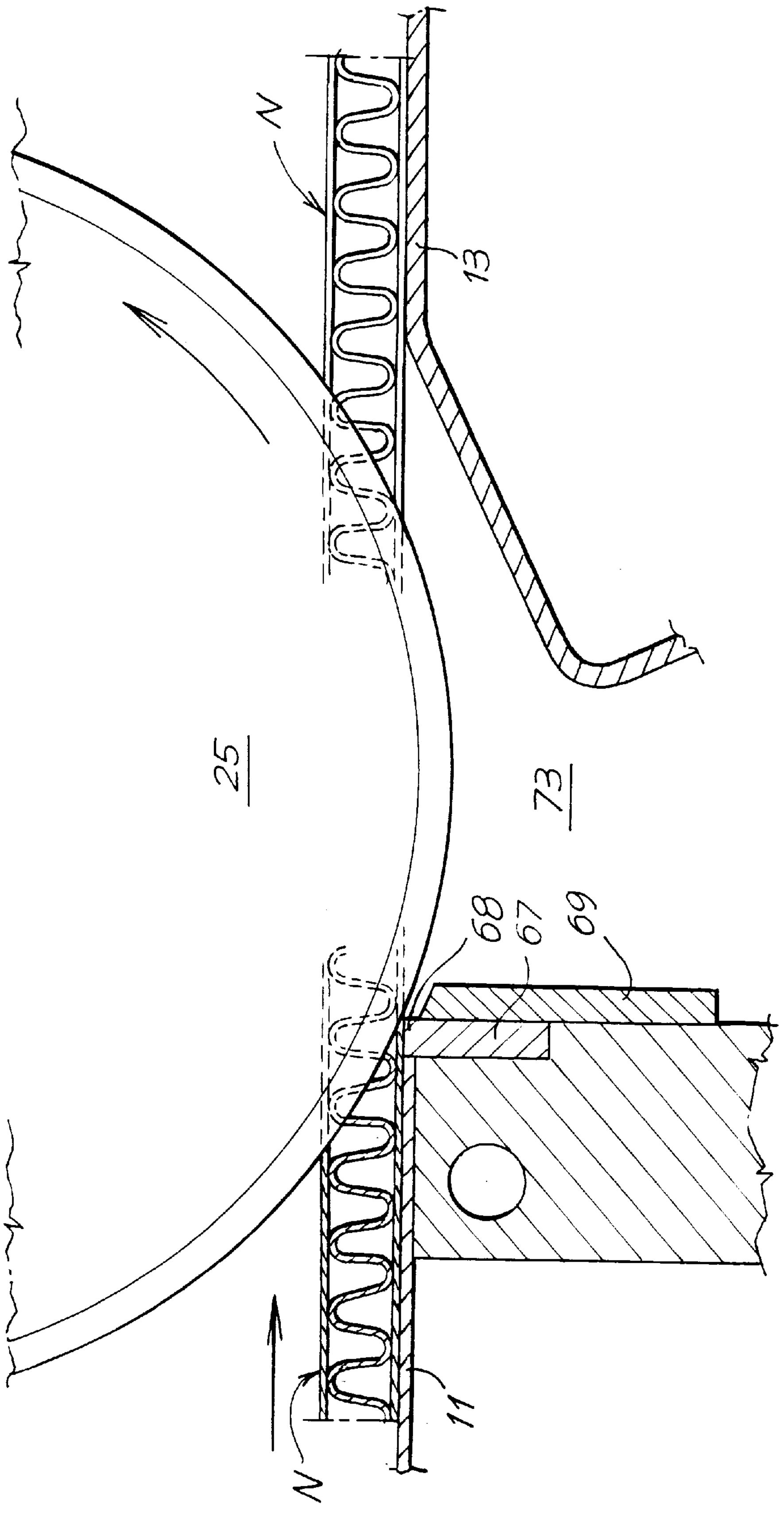
FIG. 5 shows an enlargement of the area where the web is slit.

As can be seen in particular in the enlargement, FIG. 5, when the slitting tool 25 is in the working position its cutting edge almost touches the edge 68, remaining clear of it by a few tenths of a millimeter or a few millimeters. The adjustability of the stop 41 allow precise control of the position of the cutting edge of each tool with respect to the edge 68. The opening or channel 73 allows the slitting tool 25 to project below the path P on which the web is travelling without interfering with the surfaces 11, 13.

The slitting tool 25 enters the web N just upstream of the edge 68 and passes through the entire thickness of the material without interfering with the edge 68, after which it projects into the opening 73. The supporting edge 68 is sufficient to support the web N during slitting, and in addition there is no necessity for an opposing surface for the slitting tool 25 at the point at which it is engaged in the thickness of the web N or projects below it.

With this arrangement, while the slitting tools of one slitting station (station 5 in the example) are working, the slitting tools of the other station can be positioned by a single simple manipulator situated above the path P of the web; at the same time there is no need for any positioning of a mechanical component underneath the path P.

The bar 67 may conveniently be made in a relatively soft and/or elastic material such as rubber, for example. In this way, even if the slitting tool 25 is adjusted inaccurately and cuts slightly into the edge 68 of the bar 67, the device will continue to function and the blade will not be damaged, owing to the softness or yieldability of the material of which the bar 67 is made. If this causes wear of the edge 68, the bar 67, or portions of it, can easily be replaced.

The contact and slight penetration of the cutting edge of the tool 25 into the supporting edge 68 has an advantageous effect of cleaning the cutting edge.

The embodiment described above is one of the possible embodiments, and at present the preferred embodiment, of the invention. Nonetheless, the invention can be carried out in other different ways based on the same inventive concept.

For example, all the slitting tools 25 and/or 25B may be mounted on a single block, such as a rotating shaft which may be pivoting to allow it to move towards and away from the slitting surface; in which case all the tools will be moved simultaneously toward the edge 68 of the bar 67. A single stop, optionally adjustable, defines the working position of all of the tools. It is then useful to provide an identical sharpening cycle for all of the tools so that they wear uniformly and so that a single stop can adjust the position of all of the tools with respect to the supporting edge 68.

As an alternative or addition to the presence of an adjustable stop, such as the stops 41, or of a common stop for all the tools of one slitting station, it is possible for the coming together of the supporting edge 68 and the cutting edges of the tools 25 to be achieved by moving the edge 68 itself. For this purpose the bar or bars 67 forming the supporting edge 68 may for example be adjustable in a direction parallel to the direction F in which the web is fed. If this is done, the tools can be moved until they stop in a fixed position, and once they are in this position the supporting edge 68 can be brought conveniently up against the cutting edges of the tools.

The felts for lubricating the tools may also be positioned in the empty space available beneath the slitting tools, downstream of the supporting edge 68.

It should be understood that the drawing shows only an example provided purely by way of a practical demonstration of the invention, which invention can be varied as regards shapes and arrangements without thereby departing from the scope of the concept on which the invention is based. The possible presence of reference numerals in the accompanying claims is for the purpose of facilitating the reading of the claims with reference to the description and drawing and does not limit the scope of the protection represented by the claims.

What I claim is:

1. A device for longitudinally slitting a web advancing in a longitudinal feeding direction along a web advancing path comprising:

at least one circular slitting tool having a cutting edge and rotating about an axis of rotation located on one side of said advancing path, wherein said web is a longitudinally continuous web which said cutting edge slits into a plurality of strips in the longitudinal feeding direction;

a web supporting edge positioned along said advancing path on an opposite side of said advancing path from said axis of rotation and extending essentially perpendicularly to said feeding direction, and positioned to be beneath said web when said web is advancing along said web advancing path;

said at least one slitting tool having at least one working position downstream of said web supporting edge during said slitting wherein said cutting edge of said at least one slitting tool projects beneath said advancing path and thereby beneath said web into an empty space downstream of said supporting edge with respect to said feeding direction, said cutting edge not contacting said supporting edge and said supporting edge constructed and arranged to support said web during said slitting.

2. Device as claimed in claim 1, wherein said supporting edge is fixed and extends perpendicular to said feeding direction across an entire region which said at least one slitting tool can be positioned.

3. Device as claimed in claim 1 or 2, further comprising an opening downstream of said supporting edge perpendicular to said feeding direction, said at least one slitting tool entering said opening while the web travels over said opening.

4. Device as claimed in claim or 1 or 2, further comprising:

a surface over which said web travels;

a transverse opening in said surface in correspondence of said at least one slitting tool;

said supporting edge being positioned along a longitudinal edge of said transverse opening and upstream of said transverse opening with respect to said feeding direction.

5. Device as claimed in claim 1, further comprising a plurality of slitting tools lined up perpendicular to said feeding direction and positionable to work in conjunction with said supporting edge.

6. Device as claimed in claim 1, wherein each of said at least one slitting tool is supported by an arm pivotal about a pivot axis parallel to said supporting edge and each said arm has an adjustable stop which defines an angular position of said arm when each said at least one slitting tool is in said at least one working position.

7. Device as claimed in claim 6, wherein each said arm has an actuator which independently controls pivoting movement of each said arm.

8. Device as claimed in claim 6 or 7, wherein each said at least one slitting tool has a component bracket fixed about said pivot axis to form a stop surface cooperating with said adjustable stop of said arm.

9. Device as claimed in claim 7, further comprising a plurality of blocks that are movable and positionable along a track parallel to said supporting edge, each block carrying a respective pivoting arm for a respective slitting tool.

10. Device as claimed in claim 1, further comprising:

a first series of said slitting tools with each slitting tool supported by a respective pivoting arm, and a second series of said slitting tools with each slitting tool supported by a respective pivoting arm;

said first series and said second series being controlled to work alternately; and means for positioning said first series and said second series along a direction perpendicular to said feeding direction.

11. Device as claimed in claim 10, wherein each respective pivoting arm of said first series of slitting tools points toward a pivoting arm of said second series of slitting tools.

12. Device as claimed in claim 10, further comprising a common carriage supporting said means for positioning said first series and said second series.

13. Device as claimed in claim 12, wherein said common carriage carries means for dispensing a lubricating substance for said slitting tools.

14. Device as claimed in claim 1, wherein said supporting edge is replaceable.

15. Device as claimed in claim 14, wherein said supporting edge is formed by one edge of a transverse bar clamped in a seat along a surface over which said web travels.

16. Device as claimed in claim 1, wherein said supporting edge is made of a material that is yieldable and/or softer than material of which said at least one slitting tool is made.

17. Machine for slitting and scoring a web comprising at least one scoring station and at least one slitting station, each of said at least one slitting station comprising a device according to one of claims 1, 2, 5, 6, 7, 9, 10, 11, 12, 13, 14, 15, or 16.

18. The device of claim 1 or 10, further comprising at least one scoring station located upstream of said at least one slitting tool, said at least one scoring station having at least one scoring tool for scoring said web.

19. The device of claim 18, wherein said at least one scoring station includes a series of said scoring tools arranged perpendicular to said advancing path.

20. The device of claim 18, wherein said at least one scoring station includes at least two opposing scoring tools located above and below said advancing path.

21. The device of claim 18, further comprising at least two scoring stations.

22. Method for longitudinally slitting into a plurality of strips a continuous longitudinal web comprising:

feeding the web in a longitudinal feeding direction along a web advancing path;

positioning at least one rotating circular slitting tool with an axis of rotation on one side of said advancing path;

positioning on a side opposite of said advancing path a web supporting edge essentially perpendicular to said feeding direction and beneath said web;

bringing said at least one slitting tool close to said supporting edge but clear of said supporting edge;

supporting said web along said advancing path until said supporting edge is reached; and causing said at least one slitting tool to project beneath said web into an empty space downstream of said supporting edge with respect to said feeding direction.

23. Method for longitudinally slitting into a plurality of strips a continuous longitudinal web having an upper surface and a lower surface comprising:

feeding the web in a longitudinal feeding direction along a web advancing path;

positioning at least one rotating circular slitting tool with an axis of rotation on one side of said advancing path;

positioning on a side opposite said advancing path a web supporting edge essentially perpendicular to said feeding direction and beneath said web;

bringing said at least one slitting tool close to said supporting edge but clear of said supporting edge;

supporting said web along said advancing path until said supporting edge is reached; and causing said at least one slitting tool to enter said upper surface of said web upstream of said supporting edge and to project beneath said web into an empty space downstream of said supporting edge with respect to said feeding direction.

24. The method of claim 22 or 23, further comprising passing said web through a scoring station having at least one scoring tool to score said web, said scoring station being arranged along said advancing path upstream of said at least one slitting tool.

25. The method of claim 24, further comprising passing said web through at least two scoring stations.

* * * * *